UNITED STATES PATENT OFFICE.

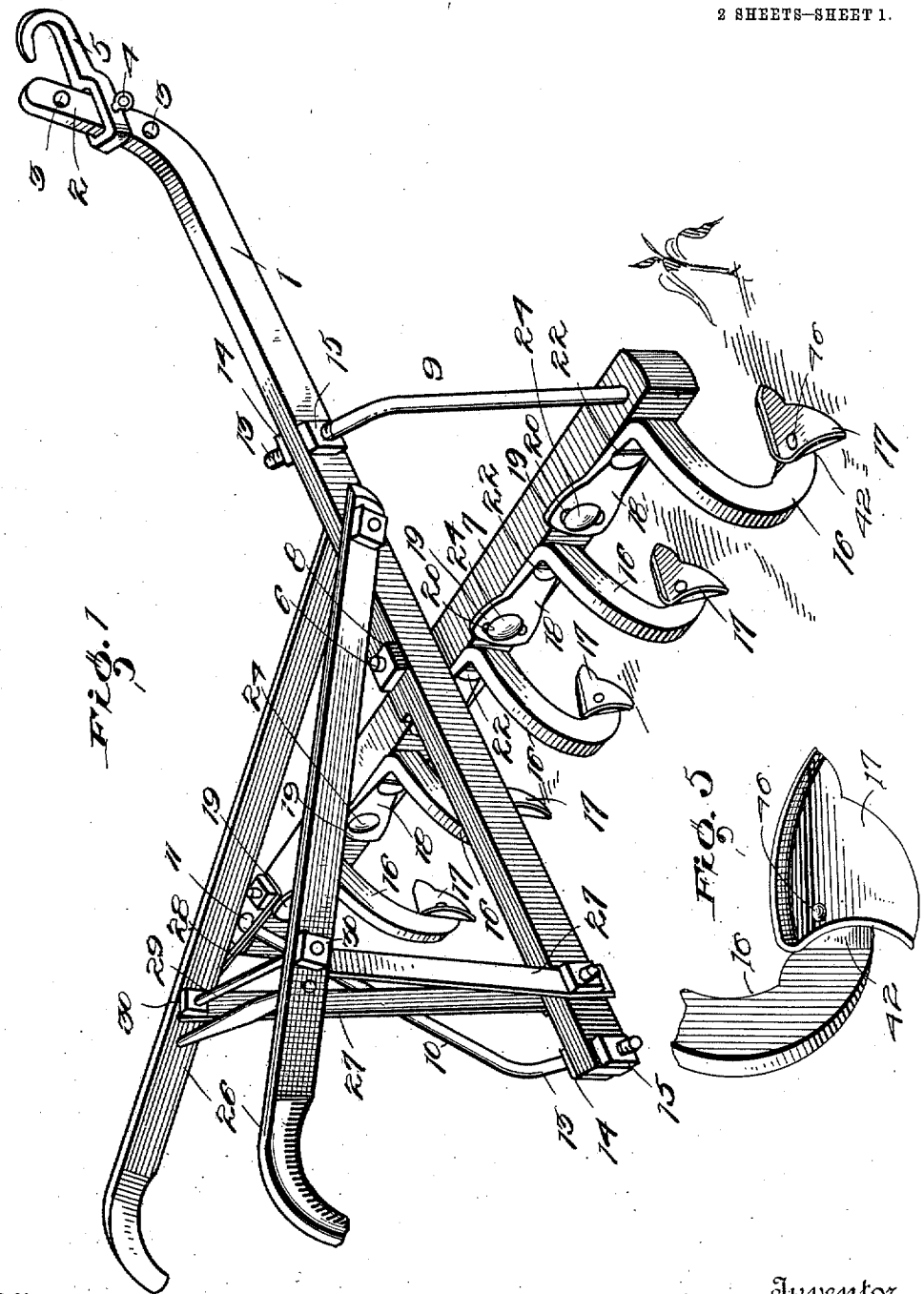

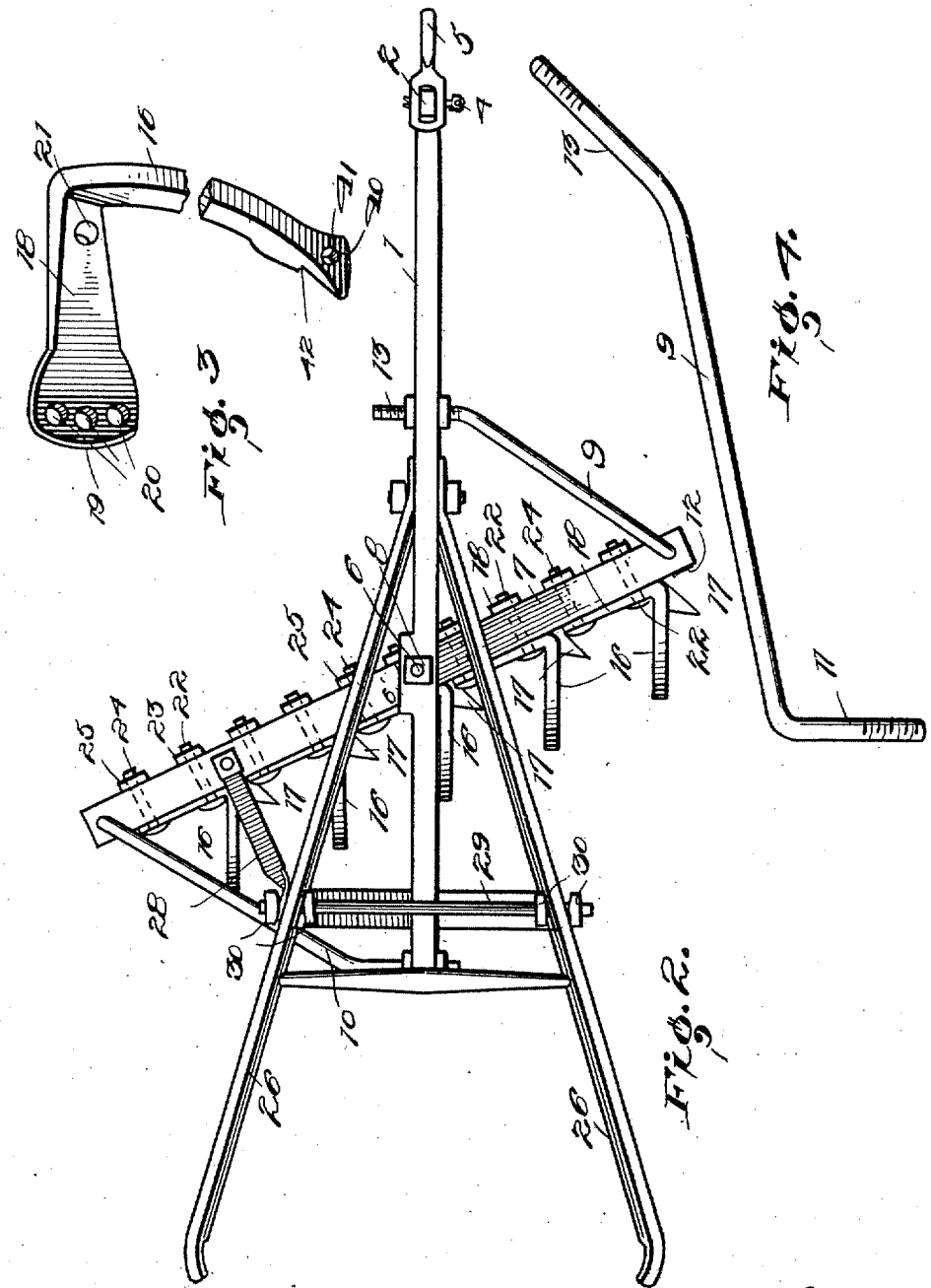

ALBERT T. RICHARD, OF CHURCH POINT, LOUISIANA.

SIDE CULTIVATOR.

985,449. Specification of Letters Patent. Patented Feb. 28, 1911.

Application filed August 4, 1910. Serial No. 575,505.

*To all whom it may concern:*

Be it known that I, ALBERT T. RICHARD, a citizen of the United States of America, residing at Church Point, in the parish of Acadia and State of Louisiana, have invented certain new and useful Improvements in Side Cultivators, of which the following is a specification, reference being had therein to the accompanying drawing.
My invention has relation to side cultivators, and it consists in the construction and arrangement of parts as will be hereinafter described and particularly pointed out in the claim.
Figure 1 is a perspective view of the improved cultivator. Fig. 2 is a top plan view thereof. Fig. 3 is a detail perspective view of one of the teeth. Fig. 4 is a detail view of one of the adjusting brace rods for connecting the draft beam and tooth bar. Fig. 5 is a perspective view of the shank with the blade attached.

Referring to the accompanying drawings by numerals, it will be seen that the improved cultivator comprises an elongated draft beam 1 the forward end 2 of which is upturned and provided with regularly spaced transverse openings 3 that are engaged by the pin 4 that is used to detachably fasten the clevis 5 to said upturned end. At an intermediate point, the draft beam 1 is offset and provided with a vertical opening through which a bolt 6 extends that holds a tooth bar 7 transversely of said beam
1. A lock nut 8 is carried by said bolt for fastening the beam and bar together. Brace rods 9 and 10 are employed for connecting the ends of bar 7 to beam 1. One rod connects with the rear portion of beam 1 and the other rod connects with the forward portion of said beam. Said rods are of duplicate construction and provided with a pendent angular end 11 that is threaded and extends vertically through the tooth bar and are rigidly but detachably fastened thereto by a nut 12. The other ends of said bars are angularly bent, as indicated at 13, and extend horizontally through beam 1. Said ends 13 are threaded and two nuts 14 and 15 are employed for adjusting the rods and then locking them in an adjusted position. With this arrangement it will be seen that by loosening nut 8 and the nuts of the brace rods 9 and 10, the tooth bar 7 may be swung pivotally to adjust the angle of the same relative to the beam 1, and afterward readily locked in the adjusted position.

A plurality of standards are employed which are curved at one portion of their lengths to provide shanks 16, and then bent at right angles to said shanks to provide extensions 18 with widened ends 19, having a plurality of approximately vertical openings 20 therein, and each of said extensions being also provided with a single opening 21 approximately near the intersection of the shank and extensions. The extensions are pivoted to the cross bar by means of bolts 22 inserted through the openings 21 and said cross bar. The widened ends of the extensions are adjustable on the cross-bar by means of bolts 24, having nuts 25 thereon. The lower ends of the shanks 16 of the standards terminate in transverse widened portions curved in vertical plane at 42 gradually decreasing in thickness to sharpened ends as shown at 40 to provide cutting edges, and said widened terminals are each provided with transverse openings 41 therein, to which are attached the inner sides of the cultivator shovels 17, having a conformation corresponding to the curve of said shanks and secured to the outer faces of said ends of the shanks by bolts 46 inserted through said shanks and said transverse openings 41, the ends of the shanks adapted to coact with said shovels during the plowing of the soil.

To adjust the teeth, bolts 24 are removed and the nuts of bolts 22 loosened so that the teeth can be swung thereon, after which the bolts 24 are passed through another of the openings 20 and by means of the nuts 25, said bolts lock the teeth in their adjusted position.

The usual handles 26 are bolted or otherwise detachably fastened to beam 1, said handles being provided with the braces 27 that are detachably fastened to said beam and with a side brace 28 that is detachably fastened to one end portion of bar 7. Said braces 27 and 28 are carried by a rod 29 that extends through the handles 26 and is locked thereto by the nuts 30.

What I claim as my invention is:—

A side cultivator comprising a beam with a lateral offset on one side of its length, a cross-beam secured to said offset and having a plurality of standards pivotally and adjustably connected thereto, said standards having curved shank portions which terminate in transverse widened portions curved in vertical plane, gradually decreasing in thickness to sharpened ends having transverse openings therein, cultivator shovels having a conformation corresponding to the vertical curve of the shanks and secured to the outer faces of said ends by bolts inserted through said shovels and said transverse openings, the ends of said shanks adapted to coact with said shovels during the plowing of the soil.

In testimony whereof I hereunto affix my signature in presence of two witnesses.

ALBERT T. RICHARD.

Witnesses:
MARTIN CORMIRY,
BERTRAND BAROUSSE.

---

Copies of this patent may be obtained for five cents each, by addressing the "Commissioner of Patents, Washington, D. C."